UNITED STATES PATENT OFFICE.

W. H. JOHNSON, OF SPRINGFIELD, ILLINOIS.

MODE OF INCORPORATING BITUMINOUS LIQUIDS WITH WET EARTHS FOR A CEMENT.

Specification forming part of Letters Patent No. 16,208, dated December 9, 1856.

*To all whom it may concern:*

Be it known that I, WILLIS H. JOHNSON, of Springfield, in the county of Sangamon and State of Illinois, have invented or discovered a new and useful Process of Making Bituminous Cements and Mortars, the bases of which are the earths, gravel, and the like substances, of which the following is a specification.

My invention consists in incorporating the bituminous liquids with the earthy base when the latter has been ground, kneaded, stirred, or otherwise mixed with water into a homogeneous paste or mortar of a proper consistency for paints, mastic, plaster, building of walls, molding into proper form for bricks, statuary, &c., as the case may require.

Heretefore in making bituminous cements and mortars it has been deemed indispensable that the earthy base should be dry at the time of mixture with the bituminous matter, and also that both should be highly heated to effect a thorough diffusion of the bitumen throughout the mass of the base. By the old process the entire fluidity or plasticity of the cement or mortar was derived from the bituminous liquid, and a large quantity of the latter therefore was in all cases required. By my new process the fluidity or plasticity of the cement is produced by water, and therefore the bituminous fluid may be used in very small proportions. In hardly any case will as high as twenty-five per cent. of the cement or mortar be bituminous fluid, while for many purposes five per cent. will be ample. By the old process neither a useful cement nor mortar could be made without using a much greater proportion than five or even twice five per cent. of the bituminous liquid, and even when used in the lowest practicable proportions the quantities were so large as to be highly detrimental to the quality of the product. The cement was in all cases used while hot, in which state its plasticity or fluidity was greatest. By my process the expense and inconvenience of heating the cement while being made and applied is saved, and also the cost of the excess of bituminous fluid, which is the most expensive material of the compound, and while the cost of the cement is thus diminished, its quality is for most purposes greatly improved.

The proportions herein mentioned of the ingredients of cements and mortars are determined by measure.

I take argillaceous or calcareous earths and water, and by any convenient process reduce them into a homogeneous cement or mortar. If the mortar be for molding into bricks to be used in a damp situation, I add to it, say, from ten to fifteen parts of coal-tar, (such as is sold at gas-works answers well,) which should be recently made, as I find that it does not mix so readily with the mortar after long exposure to the atmosphere. If the mortar is for bricks to be used in a comparatively dry situation—as, for example, the walls of a building above the ground—from five to ten per cent. of tar would be sufficient. If the bricks should be for use in a wall constantly wet, twenty-five per cent. of tar may be used. The tar is poured into the mass of the aqueous mortar, and by kneading, stirring, or otherwise thoroughly intermixed with and diffused through its mass. The tar diffuses very readily, and when diffused the aqua-bituminous cement is ready to be molded into bricks and dried. When dried they will be impervious to water and fit for the weather side of a wall. The proportions of the bitumen being so small, these bricks have very much the color and appearance of chocolate or brown stone.

To increase the strength of the bricks and diminish their cost the mortar may be mixed with coarse sand or gravel or both in any proportions not too great for the mortar to cement these granular materials into a concrete mass.

I prefer for ordinary building purposes to mix equal parts of sand and gravel and mortar when the proportion of tar is small; but when large I prefer twice as much sand and gravel as mortar.

For roofing, mastics, coating the walls of cisterns and damp cellars, the tar is mixed in the proportiom of from ten to twenty per cent., and the other materials are used in various proportions, according to the smoothness or toughness required in the coating, being in these governed as in the preparation of ordinary aqueous or hydraulic cements. These paints, mastics, and roofing are applied in the same manner that other paints, mastics, and roofings are which are prepared with oil as the solvent or vehicle for spreading the earthy base, but heat is not necessary, as with other bituminous cements, to facilitate its application.

I do not confine myself to coal-tar, although I have found it to be both a cheap and excellent article, as I contemplate the employment of other bituminous liquids instead whenever they can be obtained more cheaply or their use is more convenient. Neither do I confine myself to the proportions herein mentioned, as my invention has no reference to the origin or the proportions of the bituminous or the earthy materials.

What I claim as my invention, and desire to secure by Letters Patent, is—

The combination of bituminous liquid and aqueous cements or mortars, substantially as herein set forth.

In testimony whereof I have hereunto subscribed my name.

WILLIS H. JOHNSON.

In presence of—
F. SOUTHGATE SMITH,
WM. D. BALDWIN.